United States Patent [19]

Woollam

[11] 4,229,196
[45] Oct. 21, 1980

[54] ATOMIC HYDROGEN STORAGE METHOD AND APPARATUS

[75] Inventor: John A. Woollam, Oberlin, Ohio

[73] Assignee: The United States of America as represented by the Administrator of the National Aeronautics and Space Administration, Washington, D.C.

[21] Appl. No.: 9,887

[22] Filed: Feb. 6, 1979

Related U.S. Application Data

[62] Division of Ser. No. 837,794, Sep. 29, 1977, Pat. No. 4,193,827, which is a division of Ser. No. 676,432, Apr. 13, 1976, Pat. No. 4,077,788.

[51] Int. Cl.³ .............................................. F25J 1/02
[52] U.S. Cl. ........................................... 62/40; 62/47; 62/18; 62/12; 55/2; 423/648R; 156/344; 149/1; 44/7 R
[58] Field of Search ................ 62/12, 18, 48, 40, 47; 55/3, 2; 44/7; 423/648 R; 156/344; 149/1

[56] References Cited

U.S. PATENT DOCUMENTS

| | | | |
|---|---|---|---|
| 3,278,351 | 10/1966 | Null et al. | 149/1 |
| 4,077,788 | 3/1978 | Woollam | 423/648 R |

OTHER PUBLICATIONS

Rosen, AIAA Journal, vol. 12, No. 10, pp. 1325–1330, Manufacture and Deflagration of an Atomic Hydrogen Propellant, Oct., 1974.
Nikita et al., Chem. Abs., vol. 69, Abs. #22,307g, p. 2096 (1968).
J. C. Dash, Two Dimensional Matter, Scientific American, vol. 228, pp. 30–40 (May, 1973).

*Primary Examiner*—Norman Yudkoff
*Attorney, Agent, or Firm*—N. T. Musial; J. R. Manning; J. A. Mackin

[57] ABSTRACT

Atomic hydrogen, for use as a fuel or as an explosive, is stored in the presence of a strong magnetic field in exfoliated layered compounds such as molybdenum disulfide or an elemental layer material such as graphite. The compound is maintained at liquid helium temperatures and the atomic hydrogen is collected on the surfaces of the layered compound which are exposed during delamination (exfoliation). The strong magnetic field and the low temperature combine to prevent the atoms of hydrogen from recombining to form molecules.

1 Claim, 1 Drawing Figure

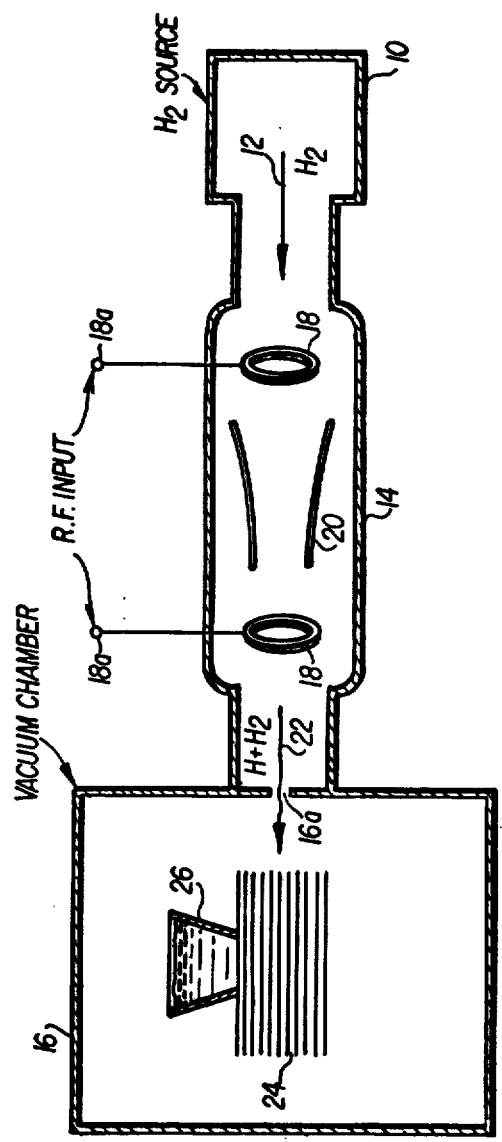

ATOMIC HYDROGEN STORAGE METHOD AND APPARATUS

ORIGIN OF THE INVENTION

The invention described herein was made by an employee of the United States Government and may be manufactured or used by or for the Government without the payment of any royalties.

This is a division of copending application Ser. No. 837,794, filed Sept. 29, 1977, which is a division of application Ser. No. 676,432 filed Apr. 13, 1976, now U.S. Pat. No. 4,077,788.

FIELD OF THE INVENTION

The present invention relates to the storage of high concentration atomic hydrogen.

BACKGROUND OF THE INVENTION

The use of atomic hydrogen as a propellant, explosive or the like has generated a great deal of interest because of the enormous amount of energy released per unit weight of fuel. For example, it has been estimated that solid atomic hydrogen rocket propellants yield about four times the amount of energy released by the combustion of the best currently available rocket propellants. These energies are liberated as a result of the reaction $H+H \rightarrow H_2$, this reaction releasing energies on the order of 51,500 calories per gram as compared with 3,180 calories per gram for the reaction $H_2 + \frac{1}{2} O_2 \rightarrow H_2O$.

Because of the highly reactive nature thereof, the storage of atomic hydrogen in high concentration presents very serious problems. Although laboratory tests indicate that small amounts of atomic hydrogen can be stored at low temperatures on substrates, the single surfaces provided by such substrates do not permit a large amount of atomic hydrogen to be collected in a small volume. One proposed solution to the problem of storing atomic hydrogen in high concentrations is disclosed in U.S. Pat. No. 3,278,351 (Null et al) wherein a solid state monolayer of molecular hydrogen is deposited on a solid metal surface and a solid state monolayer of atomic hydrogen is subsequently deposited in the potential wells of the molecular hydrogen. The surface is maintained at the liquid temperature of helium (4.2° K.) and the solid molecular-atomic layer of hydrogen is scraped off as a solid matrix product before it is thick enough to impede the escape of heat to the metal surface. Reference is made to the Null et al patent for further details of this approach as well as a background discussion of the general problem and other prior art solutions.

SUMMARY OF THE INVENTION

In accordance with the present invention, an improved method and apparatus for the storage of atomic hydrogen is provided which is practical and effective and provides a very high surface to volume ratio for hydrogen collection. Generally speaking, the invention concerns depositing or impregnating atomic hydrogen onto or into the surface of an exfoliated or delaminated body which is cooled to the temperature of liquid helium and which has a high magnetic field impressed thereon. The low temperature and the high magnetic field prevent the atoms of hydrogen from recombining to form hydrogen molecules.

The exfoliated body is produced from one of a large number of a layered compounds (also referred to as LC) such as pyrolytic graphite, $MoS_2$ and $TaS_2$. The layered compound is intercalated with a gas (preferably an inert gas) and then heated in a vacuum chamber to cause the compound to exfoliate or delaminate so as to release the intercalate gas and thus expose a large number of clean surfaces. The intercalate gas is then pumped out and the compound cooled to liquid hydrogen temperature and placed in a high magnetic field. The atomic hydrogen itself can be produced by any of several conventional processes and is collected on the large number of exposed surfaces of the delaminated compound.

Other features and advantages of the invention will be set forth in, or apparent from, the detailed discussion of a preferred embodiment.

BRIEF DESCRIPTION OF THE DRAWINGS

The single FIGURE in the drawings is a highly schematic representation of an apparatus for providing atomic hydrogen storage in accordance with the invention.

DESCRIPTION OF THE PREFERRED EMBODIMENTS

The delamination or exfoliation of layered compounds, such as graphite, is conventional and reference is made to *Scientific American*, May, 1973, page 30, for a discussion of this technique. As set forth in this article, such layered compounds comprise a layered structure wherein strong forces exist between atoms making up each layer and relatively weak forces exist between atoms of different layers. The weak interlayer forces and relatively large separations permit certain foreign molecules to fit between the planes. When such a layered compound is heated suddenly, the foreign substance tends to turn into a gas thereby producing an internal pressure that tears the layers apart. The gas can then be pumped away, leaving exfoliated layers which are all chemically clean and which have the same type of crystal face exposed for absorption.

In accordance with a preferred embodiment of the invention, an inert gas is introduced in between the planes of a graphite body, and the body then is heated in a vacuum chamber to cause both delamination of the graphite, and release and removal of the inert gas. Whatever gas remains is then pumped away so that the exposed crystal faces are chemically clean.

Once the graphite body has been delaminated and the gas removed, the body is cooled to liquid helium temperature (approximately 4° K.) and subjected to a strong magnetic field. A very large number of chemically clean surfaces are exposed by delamination of the graphite body and these are used to collect the atomic hydrogen. Hydrogen atoms, in contrast to hydrogen molecules, are magnetic and the high magnetic field combines with the very low temperature of the layered compound to create an environment that impedes the recombination of hydrogen atoms into hydrogen molecules, and hence retains the monolayer of hydrogen free radicals within the interstices of the exfoliated layered compound. The atomic hydrogen, which can be produced by any of several conventional methods, is collected (absorbed) on the large number of crystal faces thereby providing a high concentration of atomic hydrogen in a solid matrix.

Referring to the single FIGURE of the drawing, an apparatus for carrying out the method of the invention is illustrated in a highly diagrammatic manner. The apparatus includes a hydrogen source 10 which provides a flow of molecular hydrogen, as indicated by arrow 12, which passes to an electron discharge tube 14. Discharge tube 14 is exemplary of devices which can be used for supplying atomic hydrogen to a vacuum chamber 16 and includes a pair of spaced ring electrodes 18 and suitable focusing electrodes indicated at 20. An r.f. input is applied to terminals 18a of electrodes 18 to create the required magnetic field. The output of discharge tube 14 is a flow of atomic and molecular hydrogen as is indicated by arrow 22. The vacuum chamber 16 includes a very narrow slit 16a therein through which the hydrogen pass. The exfoliated layers referred to above are disposed with the vacuum chamber 16 as indicated at 24. The layers 24 are in contact with a lower temperature source 26, such as a Kelvin "cold finger," which provides the necessary low temperature. The vacuum within the vacuum chamber is from $10^{-9}$ mm of $H_g$ up to below atmospheric, with the average being generally about $10^{-6}$ mm. The admission of atomic and molecular hydrogen will, of course, reduce the vacuum.

As noted above, although graphite is used in the preferred embodiment discussed hereinbefore, transitional metal dichalcogenides of the form $TX_2$ can also be used, where T is a transitional metal and X is S, Se or Te.

The spacing between the layers should be greater than $5 \times 10^{-8}$ cm for some materials and at least $1.7 \times 10^{-8}$ for graphite. In general, a spacing between layers of at least $1 \times 10^{-8}$ cm is required.

The strength of the magnetic field used is defined as $(B/T) \geq (1 \text{ Tesla}/1 \text{ Kelvin},)$ that is, the field strength should be equal to or greater than 1 Tesla per degree Kelvin.

While a temperature of about 4° K. is preferred, the applicable temperature range is between 0° and 14° K. ($0° < T < 14°$ K.).

Although the invention has been described relative to exemplary embodiments thereof, it will be understood by those skilled in the art that variations and modifications may be effected in these embodiments without departing from the scope and spirit of the invention.

I claim:

1. An apparatus for storing atomic hydrogen in high concentration, said apparatus comprising a vacuum chamber, a delaminated layered compound located in said chamber, said compound being a transitional metal dichalcogenide of the form $TX_2$ where T is a transition metal and X is a material selected from the group consisting of S, Se or Te, means for maintaining said compound at a temperature T in the range $0° < T < 14°$ K., and means for impressing a strong magnetic field of at least 1 Tesla per degree Kelvin on said layered compound, atomic hydrogen being collected on the exposed surfaces of said delaminated layered compound.

* * * * *